F. P. CALLOW.
COMPRESSED AIR WATER ELEVATOR.
APPLICATION FILED FEB. 9, 1910.
1,000,713.
Patented Aug. 15, 1911.
3 SHEETS—SHEET 3.
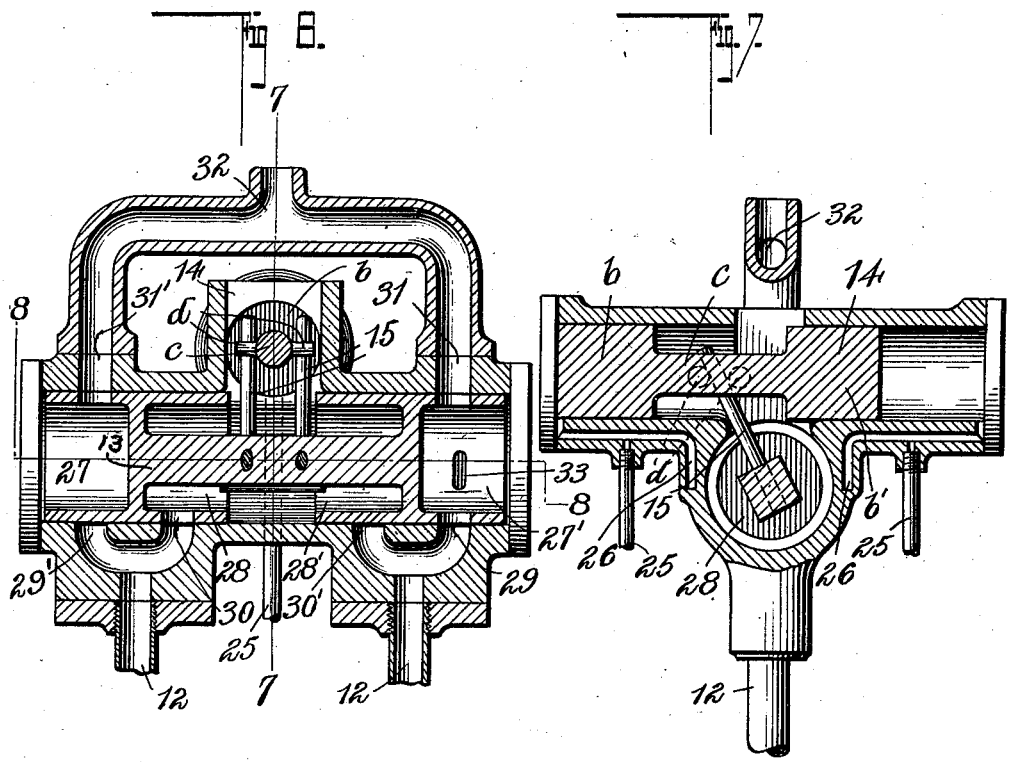
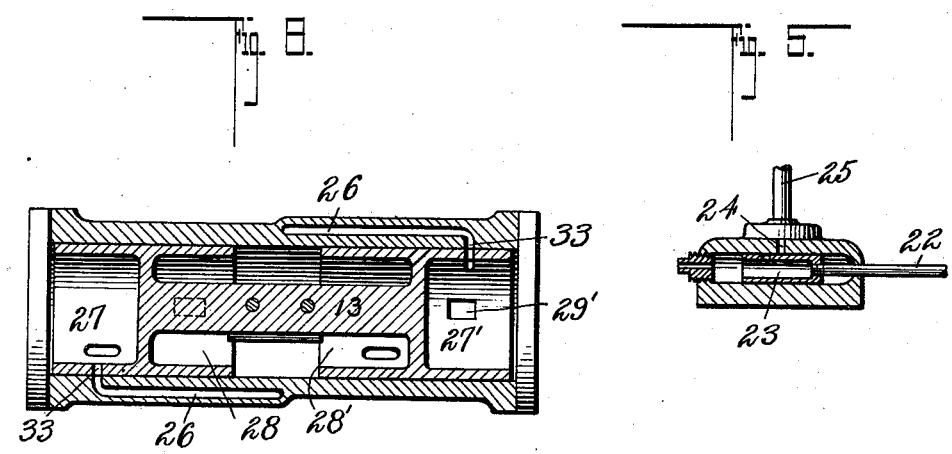

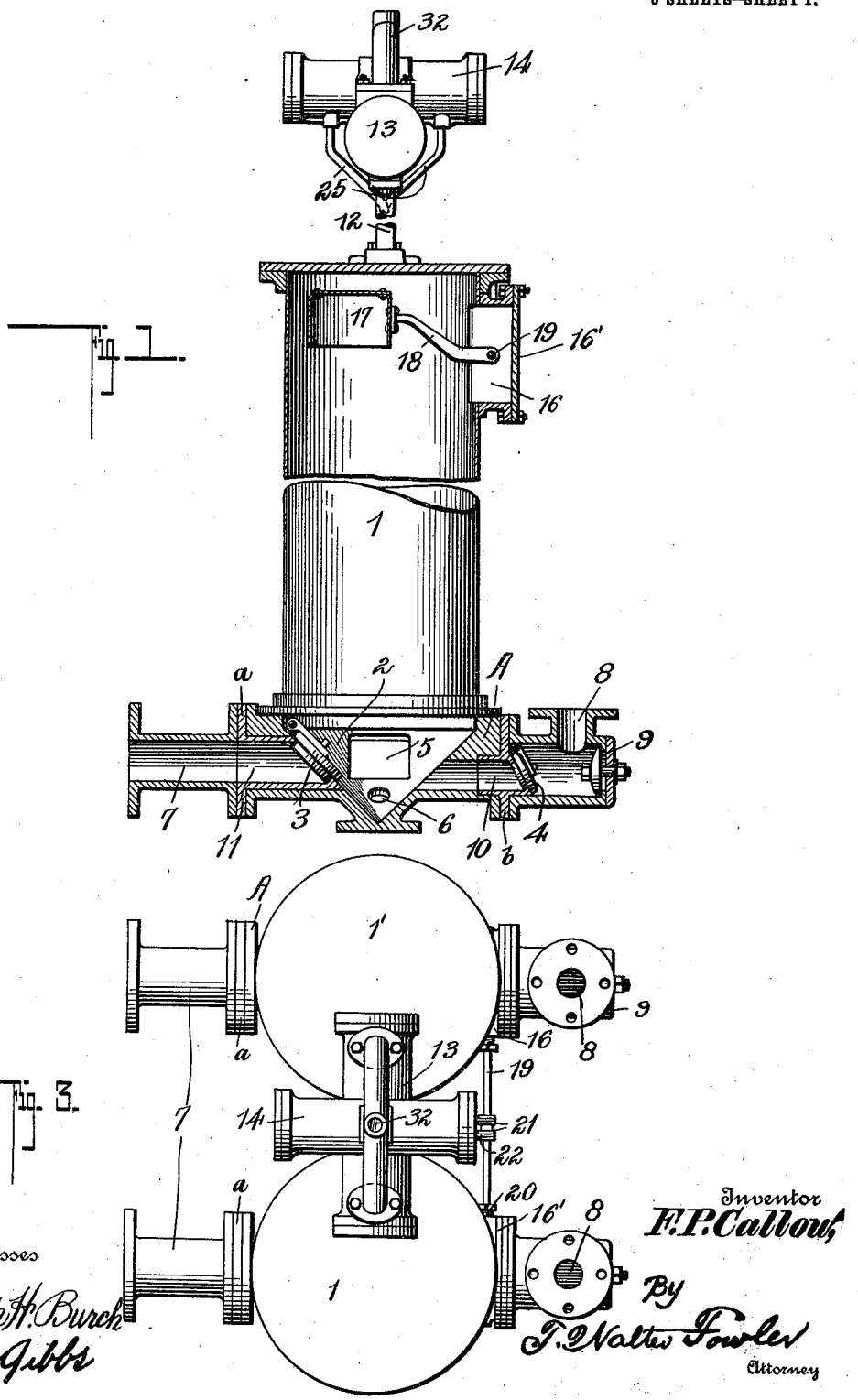

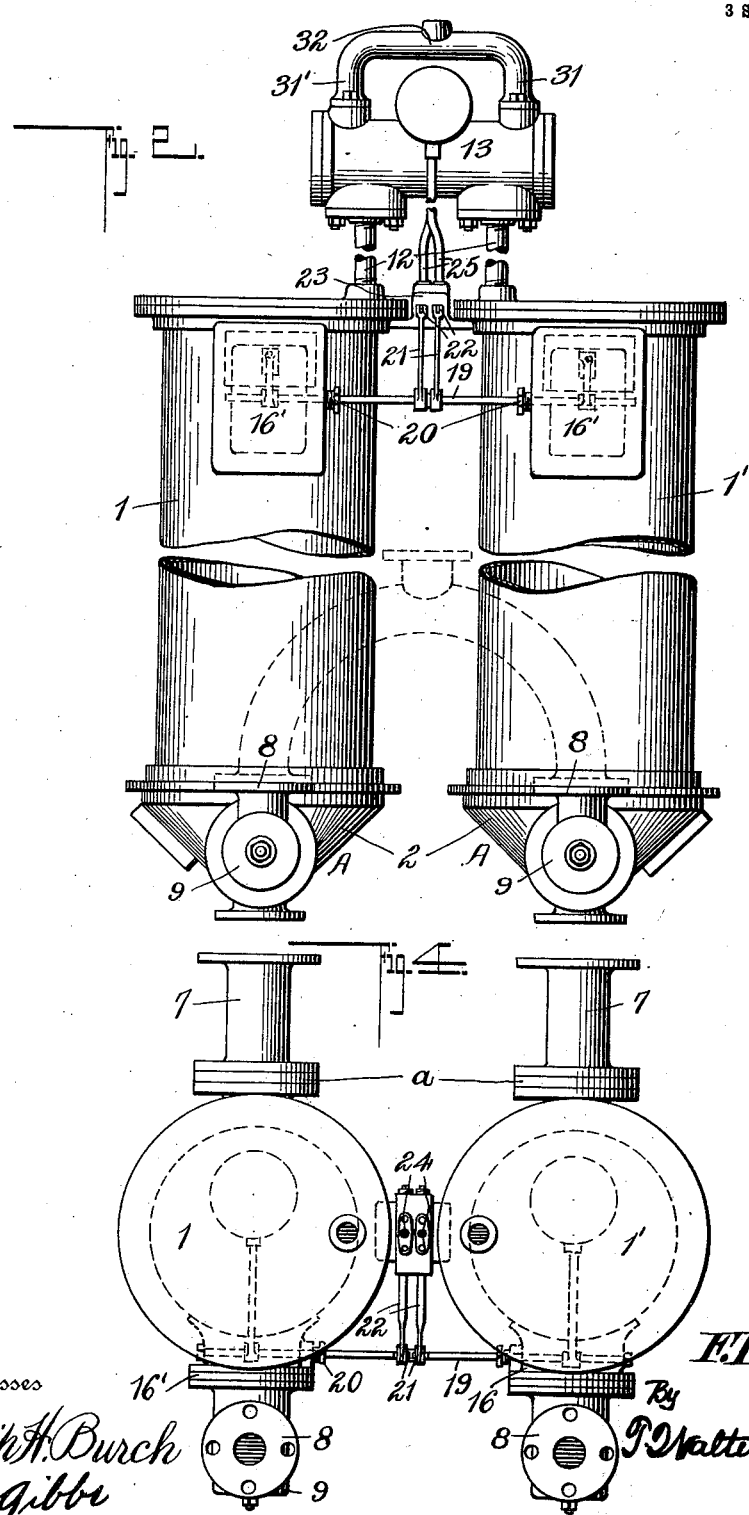

UNITED STATES PATENT OFFICE.

FRANK PETER CALLOW, OF SALT LAKE CITY, UTAH.

COMPRESSED-AIR WATER-ELEVATOR.

1,000,713. Specification of Letters Patent. Patented Aug. 15, 1911.

Application filed February 9, 1910. Serial No. 542,850.

*To all whom it may concern:*

Be it known that I, FRANK P. CALLOW, a subject of Great Britain, residing at Salt Lake City, in the county of Salt Lake and State of Utah, have invented certain new and useful Improvements in Compressed-Air Water-Elevators, of which the following is a specification.

This invention relates to an improved mechanism or apparatus for raising and elevating solids in suspension in liquids, such as sand, ore, slimes, etc., when mixed with water or other liquids; the apparatus is also useful for elevating water or other liquid alone. In either instance the apparatus is used in connection with means for admitting air under pressure in contact with the material to be elevated while contained in reservoirs which alternately fill by gravity and discharge under the influence of air-pressure, special means being provided for alternately admitting and releasing air under pressure for effecting the alternate discharge of material from the reservoirs or containers.

The invention consists of the parts and the construction, arrangements and combinations of parts, which I will hereinafter describe and claim.

In the accompanying drawings forming a part of this specification and in which like numerals indicate corresponding parts in the several views: Figure 1 is a part elevation and part sectional view of the apparatus showing a reservoir broken away to disclose its contained float; Fig. 2 is a front elevation of the apparatus with parts broken away; Fig. 3 is a plan view; Fig. 4 is a view similar to Fig. 3 with the air-distributing devices omitted; Fig. 5 is a detailed sectional view of one of the relief valves; Fig. 6 is a longitudinal sectional view through the air-distributing device; Fig. 7 is a cross-sectional view on the line 7—7 of Fig. 6; and Fig. 8 is a horizontal sectional view on the line 8—8 of Fig. 6.

In the said drawings I have shown two reservoirs, 1—1', arranged in operative relation and adapted to be filled by gravity with material to be pumped, said material adapted to enter the lower end of alternate reservoirs and to rise therein and to actuate an appropriate float as I will hereinafter describe.

The lower ends of the reservoirs are fitted to pipe fittings or castings having central chambers open at the top and which chambers are made cone-shaped or with downwardly converging walls, each of the chambers included between the walls being hereinafter designated as a valve-chest; the aforesaid castings or pipe fittings are bolted or otherwise secured to the lower ends of the reservoir shells and one of the walls of each valve-chest is provided with an inwardly opening valve, 3, said valve being hinged at its upper end and adapted to open inwardly and upwardly into the valve-chest and to control communication between the chest and an inlet pipe, 7, to which the material to be pumped is conveyed in any suitable manner and from any source of supply.

It will also be observed from Fig. 1 that the cone-shaped chamber, or valve chest formed in the casting or pipe fitting is provided with an appropriate man-hole, 5, closed by a suitable cover and adapted to afford access to the inlet valve in case of repair or for other purposes; the valve-chests also have in their lower portions suitable plug holes, 6, which permit the draining of the reservoirs of collected sediment when desired.

As before stated, the valve chests are formed by the cone-shaped chambers made in the central part of the casting or pipe fittings, A, said fittings each having one portion communicating with the inlet pipe, 7, and another portion leading to the outlet pipe or discharge, 8, which contains a suitable outwardly and upwardly opening valve, 4, to permit the material delivered from the reservoir to escape into the outlet passage, 8.

Each of the inlet and outlet valves is designed to seat against the beveled face of a removable and renewable valve-seat, one of which, 11, communicates with the inlet for the material to be pumped and has a flange, *a*, secured between the flange of the inlet pipe, 7, and a corresponding flange on the casting or pipe fitting, A, which supports the reservoir; the other valve-seat, 10, for the outlet valve has a flange, *b*, which is correspondingly clamped between said fitting and a flange on the discharge pipe, 8, as shown in Fig. 1. The discharge pipe, 8, has one end closed by a removable man-hole cover, 9, by which access is readily afforded to the outlet valve when occasion makes it necessary to inspect or to remove and renew said valve or for other purposes.

The reservoirs may be formed of any suitable material and have any desired capacity, and within these reservoirs are located suitable floats, 17, which in the form of float shown, are hollow and open from below, and are secured to suitable arms, 18, rigidly attached to shafts, 19, which rotate in appropriate bearings in the stuffing boxes, 20, said boxes being in the inner side walls of suitable man-hole casings, 16, having removable covers, 16', by which access is afforded to the upper ends of the reservoirs and to the floats which operate therein.

To the shafts, 19, are rigidly secured suitable levers, 21, as shown in Fig. 2, each of said levers extending upwardly and being connected to a pin or rod, 22, Fig. 5, and which rod is a continuation of the relief valve 23; there is one of these valves for each reservoir and each valve is controlled by one of the floats whereby the float in its rising and falling movement imparts a reciprocating movement to the relief-valve, 23, and thereby alternately opens and closes an air-port, 24, which is brought into and out of register with a corresponding port formed in the inner hollow end of the pin or rod, 22, and which end serves as a piston valve for controlling the port, 24.

The relief-valves are connected to pipes, 25, which lead to the pressure air-ports of the air controlling valve, which I will now describe. Situated in any convenient position above the reservoir is the air-distributing mechanism having means connecting with pipes, 12, leading to the upper portions of the reservoirs 1—1'. The admission of the air to these reservoirs and the exhausting of the air from the reservoirs is through these pipes, 12, and is within the control of a rotating valve, 13, Figs. 6 and 7, contained within an appropriate casing and adapted to be operated by a reciprocating motor-piston, 14, which operates cross-wise of the rotary valve and is contained in a casing, which extends at right-angles thereto or cross-wise of the casing in which the rotary valve is contained, said motor-piston having double ends, b—b', of piston-form and having a reduced intermediate portion, c, forming a chamber through which exhaust may lead to the atmosphere, as I will hereinafter describe.

The reduced portion, c, of the motor-piston is provided with spaced lugs, d; and the rotary valve has projecting from its central portion the spaced pins, 15, whose upper portions are engaged by the lugs, d, projecting from the side of the motor-piston, whereby as the motor-piston is reciprocated it imparts rotary movement to the valve, 13.

The rotary valve, 13, consists of a cylinder having two air pressure-chambers, 27—27', said chambers being located at opposite ends of the valve, as shown in Fig. 6; the rotary valve also includes two exhaust-air chambers, 28—28', which open inwardly into the space formed by the reduced portion of the motor-piston before mentioned. The chambers, 27'—28', are provided with suitable ports, 29, 29', 30, and 30', which connect at suitable times with the pipes, 12, 12, which lead to the upper ends of the reservoirs.

As shown in Fig. 6 the arrangement of the passages between chambers 27, 28, 27' and 28', is such that one air port and one exhaust port are always in connection at the same time with corresponding ports in the casing in which the valve, 13, is fitted. There are also two ports, 31—31' formed in the casing of the rotary valve and which connect with the air chambers and with the branches of a main air-supply pipe, 32, whereby air may be admitted alternately to the chambers, 27, 27'.

By reference to Fig. 8 it will be seen that the casing of the rotary valve is provided with passages, 26, 33, leading into the chambers 27—27', in the ends of the rotary valve, the said passages, 26, connecting with the pipes, 25, before mentioned and supplying air pressure for reciprocating the motor piston and thereby causing this piston to impart a rotary motion to the valve, 13, through the arms, 15, and connections before described, and bringing the other two air and exhaust ports into communication.

The operation of the apparatus is substantially as follows: The material to be elevated is directed into the pipe, 7, and in its flow therethrough it engages and opens the inlet valve, 3, said material rising in the reservoir until it engages the float, 17, and causes the latter to rock its shaft, 19, and thereby move the lever, 21, and open the relief-valve and thereby establish communication between the air port, 26, and the atmosphere through the port, 24, Fig. 5, formed in the casing of the valve, 23, said port being made in nipples fitted to the casting. This relieves the pressure on the end of the reciprocating motor-piston and the superior pressure now exerted on the opposite end of this piston and which is obtained from air delivered through the port, 26, causes the motor-piston to move to the other end of its casing and to thereby rotate the valve, 13, through the connection of the motor-piston with the arms, 15, of the rotary valve. This action brings the air port in air chamber, 27', in register with the air port, 29, and brings the exhaust air port in chamber, 28, in register with the air port, 30, thereby admitting high-pressure air through pipe, 12, to the reservoir, 1, which forces material out of this reservoir through the outlet valve, 4. At the same time air is permitted to exhaust from the other reservoir, 1', which immediately fills with material through the inlet valve at the inner end of the pipe, 7, leading to said reservoir, and on the material filling the reservoir, 1', the float, 17, of this reservoir is raised and the valve movement is reversed, the operation being the same as before described, which resets the valves for the filling of reservoir, 1, and discharging the contents of reservoir, 1'.

By means of the construction shown and described, I am enabled to elevate gritty material with the least possible wear and tear on the means employed for the purpose; though other pumps of this description are known and are suitable for raising clear liquids, their construction in general debars them in the case of liquids carrying solids in any shape and particularly solids of a gritty character such as usually found in ore-bearing slimes.

The conical form of the valve chest, or the chamber formed in the casting or pipe fitting, A, and which chamber underlies the bottom of the reservoir, is important and possesses many advantages over the flat bottom which has heretofore been used on reservoir tanks of this same general character. The cone-shape given the bottom of my tank produces a swirl in the material entering the reservoir, thereby keeping all of the solids in suspension and facilitating the discharge of the material as everything within the reservoir is swept out through the outlet valves during the discharge function, thereby preventing the accumulation of solids in the bottom of the reservoir and which occurrence has heretofore proved detrimental in other pumps of this class. Any matter which should accumulate in the bottom of the cone is readily discharged through the plugged opening, 6. Another feature of the invention is the facility of renewing the valve-seats of the inlet and outlet valves, and to renew these seats it is only necessary to remove the bolts in the flanges and draw out the entire seat and replace it with a new one. These seats being of tubular form also act as liners to prevent the incoming and outgoing material from wearing out the main body of the casting or fitting, A, with which the inlet and outlet pipes connect.

The arrangement of the inlet valve gives such a free passage to the incoming material that it causes the reservoir to fill quickly, even under a low inlet-head or pressure, thereby increasing the capacity of the apparatus by establishing a rate of inflow equal to the rate of discharge.

Among the advantages which can be attributed to the present construction are the following: 1. The absence of all flat-faced sliding valves, consequently there is greater durability and more accurate operation. 2. All valve movements are produced by the use of initial-pressure air in place of the residual or exhaust-air pressure now commonly used in water-elevators of this description, thus insuring a more positive and quicker action of the valve. As the exhaust-air pressure is controlled by the height of elevation of discharge, in the event of this discharge elevation being low, the pressure is not sufficient to give any positive movement to the valve mechanism. 3. The reservoirs are provided with a man-hole having a cover attached through which the float mechanism can be examined without disturbing any other part of the apparatus. 4. With the float open at the bottom, there is no opportunity of the same becoming water-logged, nor for it to collapse under any pressure, which may be used in the reservoir. 5. That owing to the small movement of float necessary to open the relief-valves and the instantaneous switching of the valve-mechanism (owing to the use of initial-air pressure) thereby causing the reversion of the float and the closing of the relief valve, the whole reversion from filling to discharging is so rapid as to practically eliminate all that might be termed " dead centers " in operation.

Having thus described my invention what I now claim and desire to obtain by Letters Patent is:—

1. In an apparatus for elevating liquids, the combination of a pair of reservoirs adapted to be alternately filled and emptied; castings or pipe fittings upon which the lower ends of the reservoirs are supported, said castings having cone-shaped chambers or valve chests formed therein and communicating with the bottom of the reservoirs; valve-controlled liquid inlet and discharge connections for each reservoir, said inlet connections including a valve within the cone-shaped chamber and operating in an upward direction to admit liquid into the chamber; removable lining for the inlet connection having a seat against which the inlet valve closes; an air distributing mechanism having an inlet and exhaust connecting with each reservoir; a motor-piston controlling the air supply; means for relieving pressure alternately from each end of the motor piston; and floats and connections controlled by the level of the liquid in the reservoirs for actuating said pressure relief means.

2. In an apparatus for elevating liquids, the combination of a pair of reservoirs adapted to be alternately filled and emptied; a casting or pipe fitting below and forming a support for each of the reservoirs, said casting having a cone-shaped chamber formed therein and connecting directly with the lower end of the reservoir and adapted to impart a swirl to the entering material and to thereby maintain the solid particles in suspension, and to facilitate the discharge of the material; said casting or pipe fitting having an inlet at one side and an outlet at another side, the inlet and outlet piercing the inclined walls of said chamber; an inclined inlet valve within the chamber and opening upwardly thereinto and controlling the inlet of the liquid; an upwardly opening discharge valve for the discharge passage; removable linings for the inlet and outlet passages to which linings the valves are connected, the ends of the linings serving as seats for the valves; and an air distributing mechanism for admitting air pressure alternately to the reservoirs and exhausting air therefrom, said mechanism including a motor-piston and an air-admission valve actuated thereby and introduced into the air-distributing connections, and having inlet and exhaust ports adapted to alternately connect with the reservoirs; and means controlled by the level of the liquid in the reservoirs for relieving pressure alternately from opposite portions of the motor-piston.

3. In an apparatus for elevating liquids, the combination of a pair of reservoirs adapted to be alternately filled and emptied; a casting or pipe fitting upon the upper portion of which the reservoirs are supported, said casting being formed with a downwardly convergent chamber and having an inlet and outlet passage both piercing the inclined walls of the chamber, said chamber adapted to impart a swirl to the entering material to thereby maintain the solid particles in suspension, and to facilitate the discharge of the material; inlet and outlet valves both normally inclined to the vertical and adapted to open in an upward direction, said inlet valve being contained within the chamber of the casting; removable linings fitting the inlet and outlet passages in the casting and against the ends of which said valves normally seat; air distributing mechanism for admitting air pressure alternately to reservoirs and exhausting air therefrom; and floats and connections controlled by the level of the liquid in the reservoirs for actuating the air distributing mechanism.

4. In an apparatus for elevating liquids, the combination with a reservoir, of a casting or pipe fitting upon which the reservoir is supported, said casting having a downwardly convergent chamber formed therein and opening upwardly into the bottom of the reservoir, and said casting having an inlet and discharge passage in opposite portions, an inlet valve normally inclined and adapted to open upwardly into said chamber to thereby uncover the inlet passage, and a removable lining for the inlet passage having its inner end beveled and forming a seat for the inlet valve.

5. In an apparatus of the character described, the combination of a reservoir, a casting or pipe fitting forming a support therefor, said casting having a downwardly convergent chamber the upper or enlarged portion of which connects directly with the bottom of the reservoir, an inwardly opening inlet valve and an outwardly opening discharge valve, said casting having an inlet passage and an outlet passage both piercing the inclined walls of said chamber, removable linings for said passages having inclined ends forming seats against which the valves close, said inlet valve being mounted in the chamber and adapted to open in an upward direction thereinto, and a man-hole in an inclined wall of said chamber affording access to said inlet valve.

6. In an apparatus of the character described, the combination of a reservoir, a liquid conducting pipe connecting therewith, a removable lining for said pipe having an inclined end forming a valve seat, and a valve pivoted at its upper end and adapted to open in an upward direction into the reservoir, said valve adapted to close against the inclined end of said lining.

In testimony whereof I affix my signature in presence of two witnesses.

FRANK PETER CALLOW.

Witnesses:
C. E. TAYLOR,
J. M. CALLOW.

---

Copies of this patent may be obtained for five cents each, by addressing the "Commissioner of Patents, Washington, D. C."